United States Patent Office 3,094,539
Patented June 18, 1963

3,094,539
PREPARATION OF ALIPHATIC DICARBOXYLIC ACID ANHYDRIDES
William G. Bowman, Pasadena, and Ralph O. Kerr, Houston, Tex., assignors to Petro-Tex Chemical Corporation, Houston, Tex., a corporation of Delaware
No Drawing. Filed Jan. 9, 1961, Ser. No. 81,263
4 Claims. (Cl. 260—346.8)

This invention relates to a process for the preparation of aliphatic dicarboxylic acid anhydrides and more particularly relates to a process for the preparation of ethylenically unsaturated aliphatic dicarboxylic acid anhydrides light in color and of high purity produced from ethylenically unsaturated aliphatic hydrocarbons.

Aliphatic dicarboxylic acid anhydrides such as maleic anhydride are conventionally produced by the oxidation of benzene in the vapor phase at high temperatures over suitable catalysts. The exit gases contain impure maleic anhydride. Prior art processes for the recovery of the maleic anhydride from the oxidation of benzene are varied and numerous. Methods have been proposed to dissolve the gaseous effluent from the reactor containing the maleic anhydride together with impurities in an organic solvent from which the maleic anhydride is subsequently separated. Another method is to condense the gaseous effluent and thereafter separate the maleic anhydride from the impurities by distillation. Still another method is to dissolve the effluent in water followed by dehydration to form the maleic anhydride.

While some of these methods have been effective in the preparation of maleic anhydride from benzene, the processes have not been found to be satisfactory for the preparation of high purity maleic anhydride produced from ethylenically unsaturated aliphatic hydrocarbon feeds. One possible reason for the failure of prior art benzene processes when an attempt was made to adapt them to the butene processes is because of the differences in the impurities resulting from the oxidation of aliphatic hydrocarbons versus aromatic hydrocarbons. The oxidation of either naphthalene or benzene to maleic anhydride produces such impurities as phthalic anhydride, phenol, and various aromatic acids, aldehydes, ketones, quinones and polymers and copolymers of these compounds. On the other hand, the impurities resulting from the oxidation of unsaturated aliphatic hydrocarbons are decidedly different.

According to this invention, the aliphatic dicarboxylic acid anhydrides such as maleic anhydride are obtained by oxidizing the ethylenically unsaturated aliphatic hydrocarbon at a high temperature and over a suitable catalyst to produce a gaseous effluent of maleic anhydride together with impurities. This gaseous effluent is dissolved in water whereby the anhydride forms maleic acid. The aqueous solution of crude maleic acid is then fed to a distillation column which contains a particular type of hydrocarbon which is being refluxed. The top of the column is operating at a temperature below the decomposition temperature of maleic acid to maleic anhydride. The impurities come off as bottoms and the maleic acid and water come off overhead. The maleic acid water solution is fed to a second column wherein the aqueous solution of the maleic acid is subjected to an elevated temperature in the presence of a volatile, inert, water insoluble entraining agent. The entraining agent and water are removed overhead and the purified maleic anhydride product is taken off as bottoms.

By the combination of steps of the process the aliphatic dicarboxylic acids of high purity are produced. The process steps in each of the columns remove certain impurities. The exact nature of the impurities removed in each step of the process is difficult to determine because the impurities comprise a mixture of ingredients.

The impure mixture of aliphatic dicarboxylic anhydride to be recovered according to the invention is produced by the vapor phase oxidation of ethylenically unsaturated aliphatic hydrocarbons generally. Ethylenically unsaturated aliphatic hydrocarbons of from 4 to 6 carbon atoms such as butene-1, cis or trans butene-2, butadiene-1,3, 3-methylbutene-1, isoprene, 2,3-dimethyl butadiene-1,3 and mixtures thereof are useful starting materials. The preferred starting materials are the four carbon hydrocarbons such as butene-1, butene-2 and butadiene-1,3 and mixtures thereof. Useful feeds as starting materials may be mixed hydrocarbon streams such as refinery streams. For example, the feed material may be the olefin and diolefin containing hydrocarbon mixture obtained as the product from the dehydrogenation of hydrocarbons. Another source of feed for the present process is from refinery by-products. For example, in the production of gasoline from higher hydrocarbons by either thermal or catalytic cracking a predominantly $C_4$ hydrocarbon stream may be produced and may comprise a mixture of butenes together with butane, isobutane, isobutylene and other ingredients in minor amounts. These and other refinery by-products which contain ethylenically unsaturated hydrocarbons are useful as starting materials. Although mixtures of hydrocarbons are useful, the preferred hydrocarbon feed contains at least 70 weight percent butene-2, butene-1, and butadiene-1,3 or mixtures thereof, and more preferably contains at least 90 percent of these compounds or mixtures thereof. Any remainder would be aliphatic hydrocarbons of 2 to 7 carbon atoms.

The reaction, involving vapor phase oxidation of the aliphatic hydrocarbons to aliphatic dicarboxylic acid anhydrides, requires only passing the hydrocarbon at a temperature of about 375° C. to 600° C. in low concentrations in air over a suitable catalyst. Once the reaction is begun, it is self-sustaining because of the exothermic nature thereof.

The gaseous feed stream to the oxidation reactors normally will contain air and about 0.75 to about 2.5 mole percent hydrocarbons such as butene. About 1.0 to about 1.5 mole percent of the hydrocarbon are satisfactory for optimum yield of the aliphatic dicarboxylic anhydride. Concentrations of butene-2 less than about one percent, of course, will reduce the total yields obtained at equivalent flow rates and thus are not normally economically employed. The source of the oxygen may be pure oxygen or synthetic or natural mixtures of oxygen and inert gases, such as nitrogen or helium, may be used. Dry air is entirely satisfactory.

The flow rate of the gaseous stream through the reactor may be varied within rather wide limits, but a preferred range of operations is at the rate of about 50 to 300 grams of olefin per liter of catalyst per hour and more preferably, about 100 to about 250 grams of hydrocarbon per liter of catalyst per hour. Residence times of the gas stream will normally be less than about 2 seconds, more preferably less than about one second, and down to a rate which is easily determined that less efficient operations are obtained.

A variety of reactors will be found to be useful and multiple tube heat exchanger type reactors are quite satisfactory. The tubes of such reactors may vary in diameter from about ¼ inch to about 2½ inches, and the length may be varied from about 3 to about 10 or more feet. Relatively close control of the reaction temperature should be maintained. It is desirable to have the surface of the reactors at a relatively constant temperature and some medium to conduct heat from the reactors is necessary to aid temperature control. Such media may be Woods metal, molten sulfur, mercury, molten lead, and the like, but it has been found that eutectic salt baths are completely satisfactory. One such salt bath is a sodium nitrate-sodium nitrite-potassium nitrate eutectic constant temperature mixture. As will be recognized by the man skilled in the art, the heat exchange medium will be kept at the proper temperature by heat exchangers and the like. The reactor or reaction tubes may be stainless steel, carbon-steel, nickel, glass tubes, and the like. Both carbon-steel and nickel tubes have excellent long life under the conditions of the reactions described herein. Normally, the reactors contain a preheat zone of an inert material such as ¼ inch Alundum pellets, inert ceramic balls, nickel balls or chips and the like, present at about one-half to one-fourth the volume of the remainder of the catalyst bed. However, the feed may be preheated in an external heater or the first portion of the catalyst bed may function as the preheat area.

The temperature of the reaction may be varied within some limits, but normally the reaction should be conducted at temperatures within a narrow range. The oxidation reaction is exothermic and once the reaction is underway, the main purpose of the salt bath or other media is to conduct heat away from the walls of the reactor and control the reaction. Better operations are normally obtained when the reactor temperature employed is no greater than about 100° C. above the salt bath temperature, under a given set of conditions, at which optimum conversion to maleic anhydride is obtained. The temperature in the reactor, of course, will also depend to some extent upon the size of the reactor and the hydrocarbon concentration. Under usual operating conditions the temperature in the center of the reactor, measured by thermocouple, is about 375° C. to about 550° C. The range of temperature of reactions which normally are employed in the reactor, measured as above, are in the range of about 375° C. to about 600° C. In any case, the optimum reaction temperature and/or salt bath temperature for maximum yield of desired dicarboxylic acid anhydride is readily ascertained and should be observed.

The pressure on the reactor is not generally critical, and the reaction may be conducted at atmospheric, superatmospheric or below atmospheric pressure. The exit pressure will be at least slightly higher than the ambient pressure to insure a positive flow from the reactor. The pressure of the inlet gases must be sufficiently high to overcome the pressure drop through the reactor.

The catalyst used for the oxidation of the hydrocarbons may be a variety of types. Any catalyst which gives a satisfactory yield of aliphatic dicarboxylic acid anhydride is suitable. The vanadium oxide catalysts are generally useful. For example, a catalyst with an atomic ratio of 1.0 atom of vanadium to 0.3 atom of molybdenum gives good results and the yields may be improved by the addition of 0.2 atom of antimony. As one method of preparation the $MoO_3$ is dissolved in alkaline aqueous solution and the vanadium added as $NH_4VO_3$. This solution is then heated until precipitation occurs with a carrier being added before precipitation. The antimony is added as the oxide and is added before or after precipitation. After precipitation onto the carrier the catalyst pellets are dried. The catalyst particles usually are from 2½ mesh to about 10 mesh in the Tyler standard screen size. Carriers such as compositions containing at least 75 percent alumina together with other inerts, silicon carbide, Carborundum, coke, porcelain, quartz, Vycor and the like are useful as catalyst carriers.

The gaseous vapors from the reactor exit containing the aliphatic dicarboxylic acid such as maleic anhydride together with impurities are contacted with water. The anhydride is converted to the acid and the impurities are dissolved and/or entrained in the water. This contact of the gaseous mixture from the reactor may be accomplished in any conventional manner and conventional equipment for gas-liquid mixing may be used such as scrubbers, turbo-absorbers, bubble or tray towers, absorbers, cascades, injector systems for recirculation through nozzles or towers and the like. At atmospheric pressure the temperature of the water will be from about 20° C. to 90° C. and the preferred range is about 40° C. to 60° C. Both higher and lower pressures may be used.

The product discharge from the water scrubber preferably contains about 30 to 60 weight percent of water. More desirably, the water percent is from 35 to 50 percent. The maleic acid is normally from about 3 to 6 molar (that is, moles per liter of solution at 25° C.) and best results have been obtained in the process of this invention with maleic acid molarities of about 4 to 5.

Impurities present in the water solution include weak acids which are aliphatic monocarboxylic acids of from 2 to 6 carbon atoms such as acrylic, acetic, crotonic, propionic and butyric. These weak acids are present normally from about 5 to 25 weight percent of the maleic acid. Of the weak acids, acrylic acid is usually present in the greatest percent, and the acrylic acid will ordinarily run from about 40 to 80 percent of the weak acids. Both the acetic acid and the crotonic acid will each normally run from about 5 to 35 weight percent of the weak acids. Other components in the discharge from the water scrubber are the aliphatic aldehydes of from 2 to 6 carbon atoms such as acrolein, propionaldehyde, crotonaldehyde and acetaldehyde. Of these aliphatic aldehydes acrolein is usually present in the greatest quantity. The acrolein usually runs from about 25 to 75 weight percent of the aldehydes. The total aldehydes normally run from 5 to 40 weight percent of the maleic acid. Fumaric acid may also be present from about 0.1 to 5 weight percent of the maleic. Various mixed tarry polymers may also be present from about 0.1 to 5 weight percent of the maleic acid.

The aqueous solution of the maleic acid together with the impurities is conducted to a first distillation column which contains the particular aliphatic hydrocarbon which is being refluxed. The reflux of the aliphatic hydrocarbon is maintained by operating the column with the top of the column at a temperature below the boiling point of the aliphatic hydrocarbon. The aqueous solution of the maleic acid is fed to the middle three-fifths of the column and preferably into the middle third of the column. Generally the feed is at about the vertical center point of the column.

The temperature of the aqueous solution of maleic acid being fed will be in the range of about 20 to 80° C. and generally will be from about 30 to 60° C. The column temperature at the point of entry of the feed will be from about 120° C. to 155° C. The still pot temperature of the column will be from about 130° C. to 175° C. with the temperature range preferably being from about 140° C. to 170° C. The still pot temperature will, of course, be at least as high as the boiling point of the aliphatic hydrocarbon being refluxed. The temperature at the top of the column will be controlled at a temperature from about 125° C. to 135° C. with the temperature generally being from 130° C. to 134° C. The temperature at the top of the column should be no greater than about the temperature of formation of the anhydride from the acid. Generally the temperature at the top of the column will be less than the temperature of anhydride formation.

The first distillation column may be a conventional distillation column such as a packed or plate type column. Packed columns are preferred. In some instances it may be desirable to have packing or plates only in the portion of the column above the feed inlet by eliminating the packing or plates in the lower portion of the column, the descent of the impurities to the still pot is not hampered. The column may be operated at atmospheric pressure although sometimes it is desirable to operate under a slight pressure.

The refluxing aliphatic hydrocarbon used in this first column should be a saturated aliphatic hydrocarbon with a boiling point within the range of about 110° C. to 155° C. and normally will have a boiling point range from about 130° C. to 152° C. The various octanes and nonanes and mixtures thereof have given excellent results. Higher boiling point aliphatic hydrocarbons have not been effective in removing the impurities. Moreover, when higher boiling point hydrocarbons are used, the column must be operated at higher temperatures throughout and consequently undesirable polymer and ester formation results. Aromatic hydrocarbons such as xylene are also unsatisfactory for the same reason and are further undesirable because they form azeotropes with the water and come off overhead. Similarly, hydrocarbons boiling lower than the designated range have not been effective in removing the impurities.

The maleic acid and water come off overhead and the dark colored impurities descend to the bottom of the column and to the still pot. The overhead may be conducted to a partial or complete condenser and thereafter to a decanter or phase separator to separate out any entrained aliphatic hydrocarbons which may have come over. Any aliphatic hydrocarbon separated out may then be returned to the column. The overhead may be fed either directly or after cooling to the second column of the process as described below. The impurities in the still pot may be separated from the aliphatic hydrocarbon by conventional means such as by filtration or distillation.

The aqueous solution of the purified maleic acid is conducted to a second tower. The tower or column is a fractionation tower such as a sieve plate, bubble cap or packed tower wherein the feed is preferably fed into the column in about the middle three-fifths of the column and more preferably is fed in the middle third of the column. A liquid which will form an azeotrope with the water is introduced to the tower, preferably in the upper two-thirds of the column. The water plus azeotroping liquid may together with some colored impurities distill off as overhead into a phase-separating condenser wherein the vapors are condensed and the water and azeotroping phase are separated by decantation. The azeotroping liquid may then be recycled preferably to the top of the column for re-use. The azeotroping liquid functions to remove the maleic acid dilution water, to dehydrate the maleic anhydride, and to purify the maleic anhydride. The maleic anhydride plus some azeotroping liquid comes off as bottoms from the dehydration column.

Various azeotroping liquids may be selected. Water and the maleic anhydride may or may not be miscible with the azeotroping liquid. If the azeotroping liquid is miscible with the anhydride, then it should have a lower boiling point than maleic anhydride in order that it might be separated by distillation from the anhydride. The azeotroping liquid may be, for example, the ortho, meta or paraxylenes, mixed xylenes, toluene, benzene, petroleum naphtha, chlorobenzene, ethylbenzene, dipropyl ketone and mixtures thereof and the like. Normally the boiling point of the azeotroping liquid will be from about 130 to 180° C.

The feed to the second column may be at a temperature of from about 20° C. to 90° C., and preferably will be from about 30° C. to 60° C.

The temperature of the second column is adjusted for optimum recovery of maleic anhydride. Higher temperatures may be undesirable because the isomerization of maleic acid to fumaric acid is promoted by high temperatures. However, the separation of water and the dehydration proceed at a faster rate of the higher temperatures and thus the period during which fumaric acid would be formed is reduced. The temperature at the top of the second column usually runs from about 105° C. to 160° C., but may be lower if the column is operated under reduced pressure and may be higher if pressure is used.

The overhead from the second column contains essentially all of the water together with a small quantity of maleic acid. This overhead also contains the major portion of the azeotroping liquid. As mentioned, the overhead may be conducted to a condenser and thereafter to a decanter to separate the water from the azeotroping liquid. If the azeotroping liquid is, for example, xylene, the xylene may be decanted as a top layer and returned to the top of the second column for re-use. The bottoms from the second column contains about 30 to 95 weight percent maleic anhydride and about 5 to 70 percent of the azeotroping liquid.

The maleic anhydride contained in the bottoms of the second distillation column may be separated conveniently by fractional distillation in a third column. The bottoms from the second column may be fed to the still pot of the final fractionation column. This material in the still pot may contain, for example, 70 mole percent maleic anhydride together with xylene. The xylene or other azeotroping liquid may be first taken off overhead. Xylene will be taken off at the reduced pressure of about 150 to 500 mm. of mercury. The pressure is so regulated in order to keep the pot temperature at less than 190° C. and preferably at less than about 160° C. During this operation, whether it is conducted continuous or batch-wise, better results are obtained with a reflux, and preferably where a reflux ratio of from 3:1 to 1:3 is used. During this operation the pot temperature is normally initially from about 125° C. to 140° C. and rises to about 145° C. to 155° C. as the azeotroping liquid is removed.

After essentially all of the azeotroping liquid has been taken off the bottoms, a cut which amounts to about .5 to 3.0 weight percent of the charge may then be taken off and discarded or recycled to the second column feed. This intermediate cut may contain residual dark impurities and further helps remove impurities from the maleic anhydride. The reflux during this cut preferably is from 5 to 25 parts of reflux per part of overhead taken off. The pure maleic anhydride may then be distilled off as overhead. The pot temperature will initially be at a temperature of about 140° C. to 150° C. when the pressure is about 160 to 180 mm. of Hg absolute. This maleic anhydride has a purity of about 98 to 99.7 percent and is very light in color. The end point of a batch operation is reached when the bottoms temperature rises to about 160–190° C. and preferably between 165–170° C. Of course, the above operations in this fractionation column may be performed continuously. In a continuous operation, for example, the maleic anhydride may come off as a side stream and the azeotroping liquid comes off at the top.

In a typical embodiment of this invention, butene-2 was oxidized with air to maleic anhydride in a 1 inch tubular gas phase reactor with a $V_2O_5$—$MoO_3$ catalyst. The jacket salt bath was 500° C. and 1.5 mol percent butene-2 in air was used. The gaseous vapors from the reactor exit were dissolved in a water scrubber at a temperature of 50° C. An impure aqueous solution weighing 4,970 g. and containing 1910 g. of maleic acid was obtained. This solution was fed at a temperature of 50° C. to a column which was distillation column 2 inches in diameter and which was vacuum jacketed and had a vertical center feed inlet. The upper section of the column above the feed inlet consisted of a 3.5 foot long packed section. Similarly, the lower section of the column was 3.5 foot long packed section. The packing used was ½ inch Berl saddles. The still pot was a 12 liter pot equipped with a heater mantle. To the top of the column was attached a phase dividing condensation trap to allow the heavy phase to be continuously removed from the head.

To the still pot was charged 2655 g. of 95% n-nonane and heat was applied to reflux the nonane. After the nonane was refluxing in the column, the aqueous solution of crude maleic acid from the scrubber was continuously fed to the middle of the column for 7 hours at a rate of 11.8 g. per minute. The column was operated with a still pot temperature of 152.5±1° C. The temperature in the center of the column at the point of acid feed was 132°

C. and the temperature at the top of the column was 129 to 130° C. The maleic acid and water were continually taken off overhead until the run had been completed. The aqueous solution of maleic acid taken off overhead was 4120 mm. and contained 1615 g. of maleic acid. The still pot contained impurities together with 66 g. of maleic anhydride.

The aqueous solution of maleic acid taken overhead was cooled in a condenser to a temperature of about 50° C. and fed to a second column. The second column was a 2-inch I.D. distillation column with the feed inlet approximately in the center of the column. Above the feed inlet the upper half of the column consisted of a 3.5 foot section packed with ½ inch ceramic Berl saddles. The lower half of the dehydration column was 3½ feet long and contained 10 stainless steel plates with each plate having sixteen ¼ inch diameter holes symmetrically placed in the plate. The top plate was 11 inches below the feed inlet and the plates were 2⅜ inches from centerline to centerline. The dehydration column still pot was initially charged with equivalent to 4.0 liters of 100 percent mixed (ortho, meta, para) xylene under standard conditions. The xylene was heated at atmospheric pressure until steady reflux conditions were attained. The pot heating mantle drew 10 to 12 amps. at 110–120 volts A.C. No further xylene was added during the run. The 4.0 molar maleic acid solution was continuously fed into the column at a rate of about 10 ml. per minute. The initial bottoms temperature was 140° C. and rose to 155° C. by the end of the run. The column head temperatures ranged from 120° C. to 125° C. during the course of the run. The xylene and water overhead vapors were condensed in an overhead condenser. The xylene was separated from the water by decantation and was steadily returned to the column. The water layer was discharged from the system. At the end of the run the still pot contained about 7 weight parts of maleic anhydride for every three weight parts of xylene. The maleic anhydride was of high purity and was essentially colorless.

The bottoms from the second column still pot, which contains the maleic anhydride, was then transferred to the still pot of a fractionation column. The fractionation column was a 2-inch I.D. column packed with 4 feet of ½ inch ceramic Berl saddles. In the first phase of the distillation the xylene was taken off overhead as a first cut. The xylene removal was begun under a reduced pressure of about one-half atmosphere. As the xylene was removed, the pressure on the column was reduced to about 170 to 200 millimeters Hg in order to control the temperature in the still pot. The pot temperature was initially 130° C. to 135° C. and rose to 150° C. as the solvent was removed. A reflux ratio of about 1 to 1 was used.

After all of the xylene had come off, the reflux ratio was increased to about 15 to 1 and an overhead cut amounting to about 1.0 weight percent of the charge was then discarded. This 1 percent cut contained maleic anhydride together with a small amount of contaminants including dark color bodies.

The pure maleic anhydride was then taken off as an overhead. No reflux was used during this operation. The maleic anhydride had a purity of greater than 99 percent. The end point of this maleic anhydride distillation was reached when the bottoms temperature rose to about 170° C. The pot residue contained some maleic anhydride together with a small amount of fumaric acid and miscellaneous resinous materials.

The aliphatic dicarboxylic anhydrides produced according to this invention have numerous well known uses. The products are used as ingredients to form polyester resins such as alkyd resins, for example, with glycerol. They are also useful as modifying agents for plasticizers, stabilizers and antistatic agents.

While this invention has been described in detail and preferred embodiments have been given, it is understood that various changes may be made and equivalent ingredients substituted without departing from the scope of the invention.

We claim:

1. A process for the preparation of high purity maleic anhydride which comprises oxidizing ethylenically unsaturated aliphatic hydrocarbons of from 4 to 6 carbon atoms in a vapor state to form a crude vapor containing maleic anhydride, dissolving said crude vapor in water to form an aqueous solution, feeding said aqueous solution to a first column which contains a refluxing saturated aliphatic hydrocarbon of a boiling point of about 130° C. to 152° C., said first column having an internal temperature at the top of the column of no greater than about 135° C., taking off an aqueous solution of acid overhead and taking off impurities as bottoms from the column, feeding said aqueous solution of maleic acid to a second column which contains a refluxing organic liquid which forms an azeotrope with water, and which boils at a temperature lower than maleic anhydride, whereby the maleic acid is dehydrated to maleic anhydride and the water of solution and water of hydration are thereby distilled off overhead as an azeotropic mixture and the maleic anhydride is taken off as bottoms.

2. A process for the preparation of high purity maleic anhydride which comprises oxidizing ethylenically unsaturated aliphatic hydrocarbons selected from the group consisting of butene-1, butene-2, butadiene-1,3 and mixtures thereof in a vapor state to form a crude vapor containing maleic anhydride, dissolving said crude vapor in water to form an aqueous solution, feeding said aqueous solution to a first column which contains a refluxing saturated aliphatic hydrocarbon of a boiling point of about 130 to 152° C., said first column having an internal temperature at the top of the column of no greater than about 135° C., taking off an aqueous solution of acid overhead and taking off impurities as bottoms from the column, feeding said aqueous solution of maleic acid to a second column which contains a refluxing organic liquid which forms an azeotrope with water and which boils at a temperature lower than maleic anhydride whereby the maleic acid is dehydrated to maleic anhydride and the water of solution and water of hydration are thereby distilled off overhead as an azeotropic mixture and the maleic anhydride is taken off as bottoms.

3. A process for the preparation of high purity maleic anhydride which comprises oxidizing butene in a vapor state to form a crude vapor containing maleic anhydride, dissolving said crude vapor in water to form an aqueous solution, feeding said aqueous solution to a first column which contains a refluxing n-nonane, said first column having an internal temperature at the top of the column of from 130° C. to 134° C., taking off an aqueous solution of maleic acid overhead and taking off impurities as bottoms from the column, feeding said aqueous solution of acid to a second column which contains a refluxing xylene whereby the maleic acid is dehydrated to maleic anhydride and the water of solution and water of hydration are thereby distilled off overhead as an azeotropic mixture and the maleic anhydride is taken off as bottoms.

4. A process for the preparation of high purity maleic anhydride which comprises oxidizing butene in a vapor state to form a crude vapor containing maleic anhydride, dissolving said crude vapor in water to form an aqueous solution, feeding said aqueous solution to a first column which contains a refluxing n-nonane, said first column having an internal temperature at the top of the column of from 130° C. to 134° C. taking off an aqueous solution of maleic acid overhead and taking off impurities as bottoms from the column, feeding said aqueous solution of acid to a second column which contains a refluxing xylene whereby the maleic acid is dehydrated to maleic anhydride and the water of solution and water of hydration are thereby distilled off overhead as an azeotropic mixture and the maleic anhydride is taken off as bottoms, fractionally distilling the bottoms from the second column to distill off the xylene.

References Cited in the file of this patent

UNITED STATES PATENTS

| | | |
|---|---|---|
| 2,683,110 | Rousseau | July 6, 1954 |
| 2,832,802 | Kohn | Apr. 29, 1958 |